United States Patent [19]
Motoori

[11] Patent Number: 5,347,417
[45] Date of Patent: Sep. 13, 1994

[54] POWER SUPPLY PROTECTION SYSTEM APPLIED TO OPTICAL SUBSCRIBER NETWORK

[75] Inventor: Hideyuki Motoori, Kawasaki, Japan

[73] Assignee: Fujitsu Limited, Kawasaki, Japan

[21] Appl. No.: 49,088

[22] Filed: Apr. 20, 1993

[30] Foreign Application Priority Data

Apr. 20, 1992 [JP] Japan .................................. 4-099720

[51] Int. Cl.$^5$ .............................................. H02H 3/30
[52] U.S. Cl. ...................... 361/64; 361/84; 361/63; 361/62
[58] Field of Search ............... 361/64, 68, 71, 77, 361/84, 42, 119, 61; 324/522–526, 528; 307/29

[56] References Cited
U.S. PATENT DOCUMENTS

| | | | |
|---|---|---|---|
| 4,538,196 | 8/1985 | Sun et al. | 361/64 |
| 4,996,646 | 2/1991 | Farrington | 364/483 |

FOREIGN PATENT DOCUMENTS

58-201427 11/1983 Japan .

*Primary Examiner*—A. D. Pellinen
*Assistant Examiner*—Sally C. Medley

[57] ABSTRACT

A system for protecting a remote power supply for supplying power to an optical subscriber network, via a pair of power supply lines, from a remote power supply apparatus, being provided with power supply branch apparatuses inserted into the power supply lines in correspondence with each power receiving circuit respectively mounted in subscriber transmission nodes. Each of the power supply branch apparatuses comprises relay contacts inserted into its own power supply branch lines connected between the power supply lines and its own power receiving circuit, and a relay energized by an overcurrent detector or first and second communication units to change over the relay contacts. The relay contacts are opened and closed subscriber by subscriber sequentially to detect a faulty portion, and thereafter, the power is fed again selectively to the subscribers which have not experienced the fault.

10 Claims, 6 Drawing Sheets

POWER SUPPLY PROTECTION SYSTEM APPLIED TO OPTICAL SUBSCRIBER NETWORK

BACKGROUND OF THE INVENTION

1. Field of the Invention

The present invention relates to a power supply protection system, and more particularly to a power supply protection system applied to an optical subscriber network having subscriber transmission nodes.

In most cases, a central office is located at the center of each big city. In this case, it is not economical for the carrier to distribute transmission lines separately to reach each of the subscriber if they live in the suburbs of the big city.

To cope with this, it is a recent trend to mount, for the subscribers living in the suburbs, a small capacity subscriber accommodation apparatus for suburban use, i.e., a remote office, where the remote office and the central office are connected through a single optical fiber transmission line.

In the above case, it is further proposed to connect the remote office and the subscribers in the suburbs with the use of an optical fiber transmission line, whereby an optical subscriber network is set up. This is referred to in North America, as FITL which means Fiber In The Loop, and can cope with a future broadband ISDN.

The present invention refers to a power supply which is to be adopted to the above mentioned optical subscriber network.

2. Description of the Related Art

In a conventional subscriber network, transmission signals are transferred on metallic wires, and therefore it is possible to supply power to the subscribers by commonly using the metallic wires. However, in the optical subscriber network no such metallic wires are used, and accordingly, power must be supplied independently to each subscriber separately from the optical fibers.

Under the above circumstances, it has been proposed to supply commercial power to each subscriber's terminal equipment independently. This measure, however, is not suitable, because, if the commercial power supply is cut off, normal communication for the related subscriber can no longer be maintained.

This being so, it has been proposed to supply power to each subscriber from a remote power supply apparatus mounted in the remote office. In this case, it is possible to distribute many pairs of power supply lines to each subscriber respectively. However, the power supply lines play a role merely to carry a power and no role in transferring information as does the optical fiber transmission line. From this viewpoint, it is preferable to distribute a single pair of power supply lines commonly used by a plurality of subscribers. This enables a considerable reduction in the cost of constructing power supply facilities.

As will be explained in detail hereinafter, each subscriber transmission node is located along the side of a road and a pair of power supply lines is buried at a shallow level along the road. Therefore, the power supply lines and the subscriber transmission nodes are in an environment liable to be destroyed by a road construction, wheels of a car and the like. Thus, there is a high possibility for the power supply lines and the subscriber transmission node to suffer from trouble in the power supply such as a ground fault, a short-circuit fault, an open-circuit fault and so on.

In general, it is impossible to perfectly prevent such trouble in the power supply from occurring, and therefore, if such trouble does occur, the overall subscribers suffer from the trouble in common, and thereby, a service interruption may occur for all the subscribers at one time. This is a considerable problem.

SUMMARY OF THE INVENTION

Therefore, the present invention, in view of the above problem, has as its object the provision of a power supply protection system which can supply power again to some subscribers selectively which are able to still receive the power, even once trouble in the power supply, such as a ground fault, a short-circuit fault, an open-circuit fault and so on, has occurred, so that communication service can be recovered for the above selected subscribers.

To attain the above object, the present invention is basically comprised of a plurality of power supply branch apparatuses which are inserted in series with a pair of power supply lines, and disposed in correspondence with and close to respective subscriber transmission nodes. Each of the power supply branch apparatus comprises: normally closed contacts which are inserted in a pair of power supply branch lines distributed from the pair of the power supply lines to a power receiving circuit mounted in each subscriber; an overcurrent detector which is inserted in the pair of the power supply lines; and a relay which is energized at least by the overcurrent detector if it detects an overcurrent flowing through the pair of power supply lines so as to open the aforesaid normally closed contacts.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
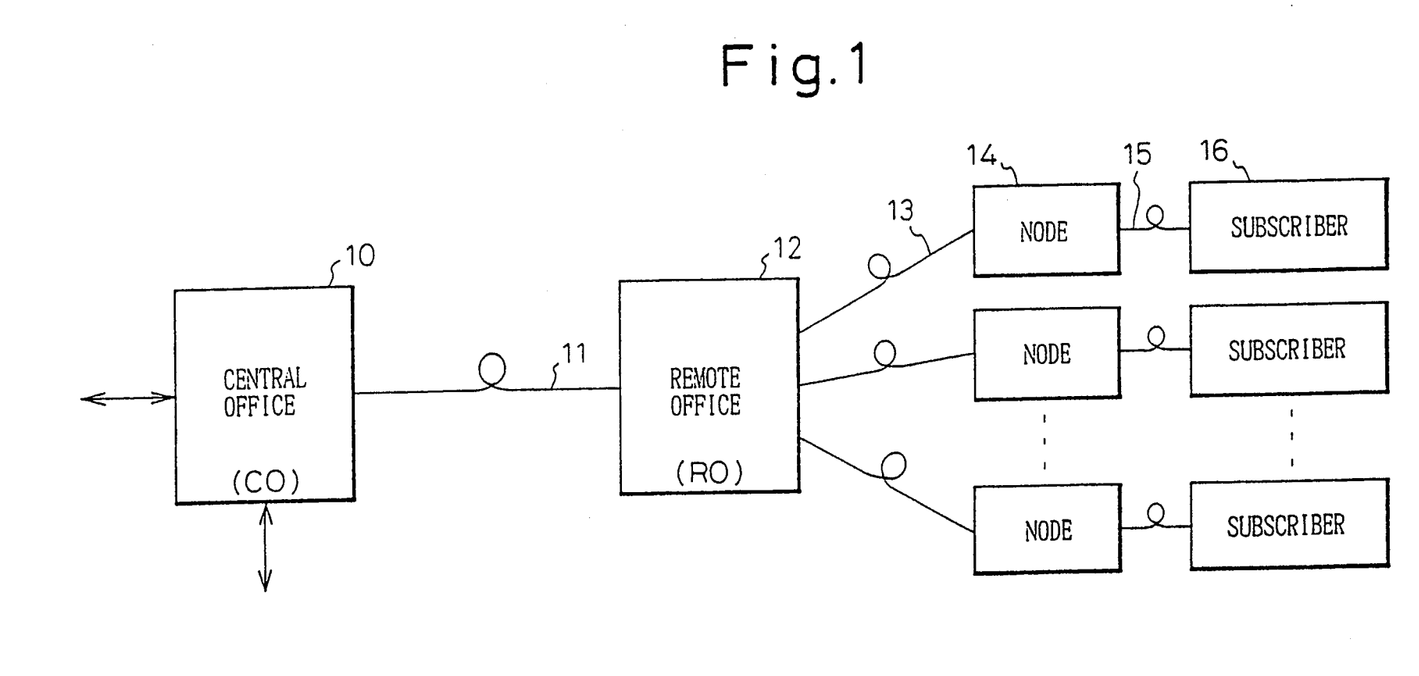
FIG. 1 is a general view of a network to which the present invention is adopted.

FIG. 1 is a general view of a network to which the present invention is adopted. In FIG. 1, as mentioned earlier, it is not economical to connect a central office 10 located in the center of a big city with subscribers 16 living in the suburbs, via respective transmission lines independently. To improve this, a remote office 12 is established therebetween and a common optical transmission line is distributed between the central office 10 and the remote office 12. The remote office 12 is constructed as an unmanned enclosure and disposed relatively close to the subscribers 16. Under the circumstance, even if the aforesaid respective optical transmission lines 13 and 15 are distributed, from the remote office 12, to each of the subscribers individually, this is not so economical. In this case, the connections between the remote office 12 and respective subscribers are preformed via subscriber transmission nodes 14 which are provided to the subscribers 16 respectively. Each of the subscriber transmission nodes is usually built, at the side of the road, as a box of a cylindrical shape and several tens of centimeters in height. Here, the optical subscriber network to which the present invention relates is defined as an optical communication network extending from the remote office 12 to the end points, i.e., the subscribers 16.

Figure 2:
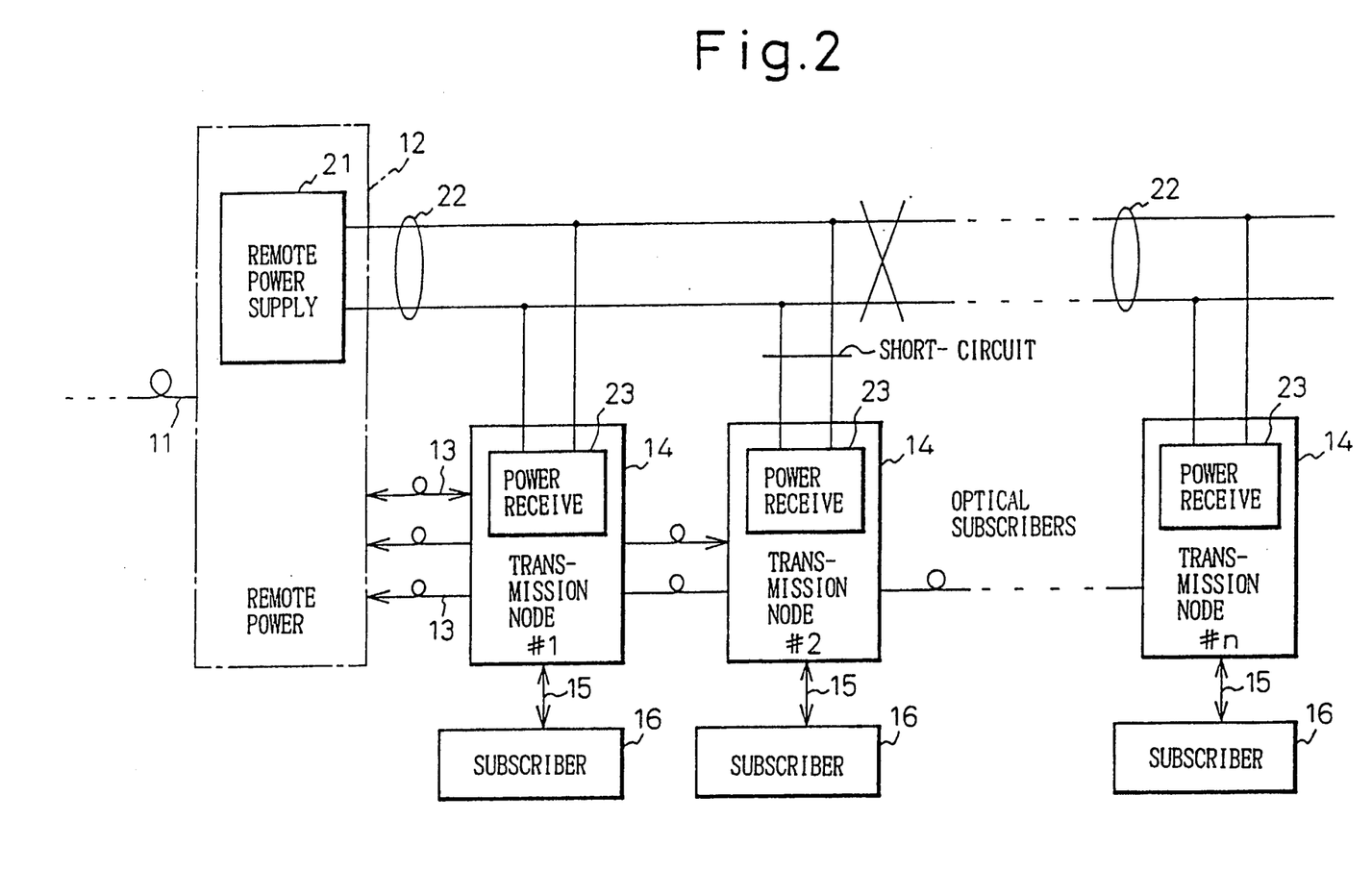
FIG. 2 illustrates a power supply route for an optical subscriber network.

FIG. 2 illustrates a power supply route for an optical subscriber network. The power supply route shown in FIG. 2 provides a remote power supply to power receiving circuits 23 mounted in respective subscriber transmission nodes 14 from a remote power supply apparatus 21 via a pair of power supply lines 22 in a multi-drop form.

If a metallic wire type transmission line is used as in the prior art, it would be possible to share the metallic wire for inherent communication use as a wire for common power supply use. However, if optical fiber transmission lines 13 and 15 are used as shown in FIG. 2, it is impossible to realize the above mentioned common power supply use.

Under the above circumstances, as mentioned before, it has been proposed to supply power to each subscriber's terminal equipment independently from commercial power. This measure, however, is not suitable, because, if the commercial power supply is cut off, normal communication for the related subscriber can no longer be maintained.

To improve this situation, the power supplied to respective subscribers 16 should be derived commonly from the remote power supply apparatus 21 which is mounted in the remote office 12.

In the above case, it could be considered to distribute respective pairs of power supply lines to each subscriber 16 independently. Practically, however, the single pair of the power lines 22 should be commonly used by all the subscribers 16, since the lines 22 are used not for transferring information but merely for supplying power. This enables a cost reduction in constructing power supply facilities, as mentioned earlier.

As mentioned before, each subscriber transmission node 14 is located at the side of the road and the pair of the power supply lines 22 is also buried at a shallow level along the road. Therefore, the power supply lines 22 and the subscriber transmission nodes 14 are placed in an environment liable to be destroyed by road construction, wheels of a car and the like. Thus, there is a high possibility of the power supply lines 22 and the subscriber transmission nodes 14 suffering from the power supply trouble, such as a ground fault, a short-circuit fault, an open-circuit fault and so on. Thus the aforementioned problem occurs. For example, referring to FIG. 2, assuming that a short-circuit fault (the same would apply to a ground fault) occurs at a portion indicated as "SHORT-CIRCUIT", the trouble in the power supply due to the fault is not limited to the subscriber 16 (#2) only but goes farther to the remaining subscribers 16 (#1 . . . #n). Further, in FIG. 2, assuming that the pair of the power supply lines (cable) 22 is cut off at a portion indicated by "X", the open-circuit fault, after once being short-circuited, may occur. In this case, normal communication is stopped for all the subscribers 16, although the subscribers up to the subscriber 16 (#2), i.e., the subscribers 16 (#1 and #2) would recover normal communication if the power supply is restarted after the occurrence of the open-circuit fault.

Figure 3:
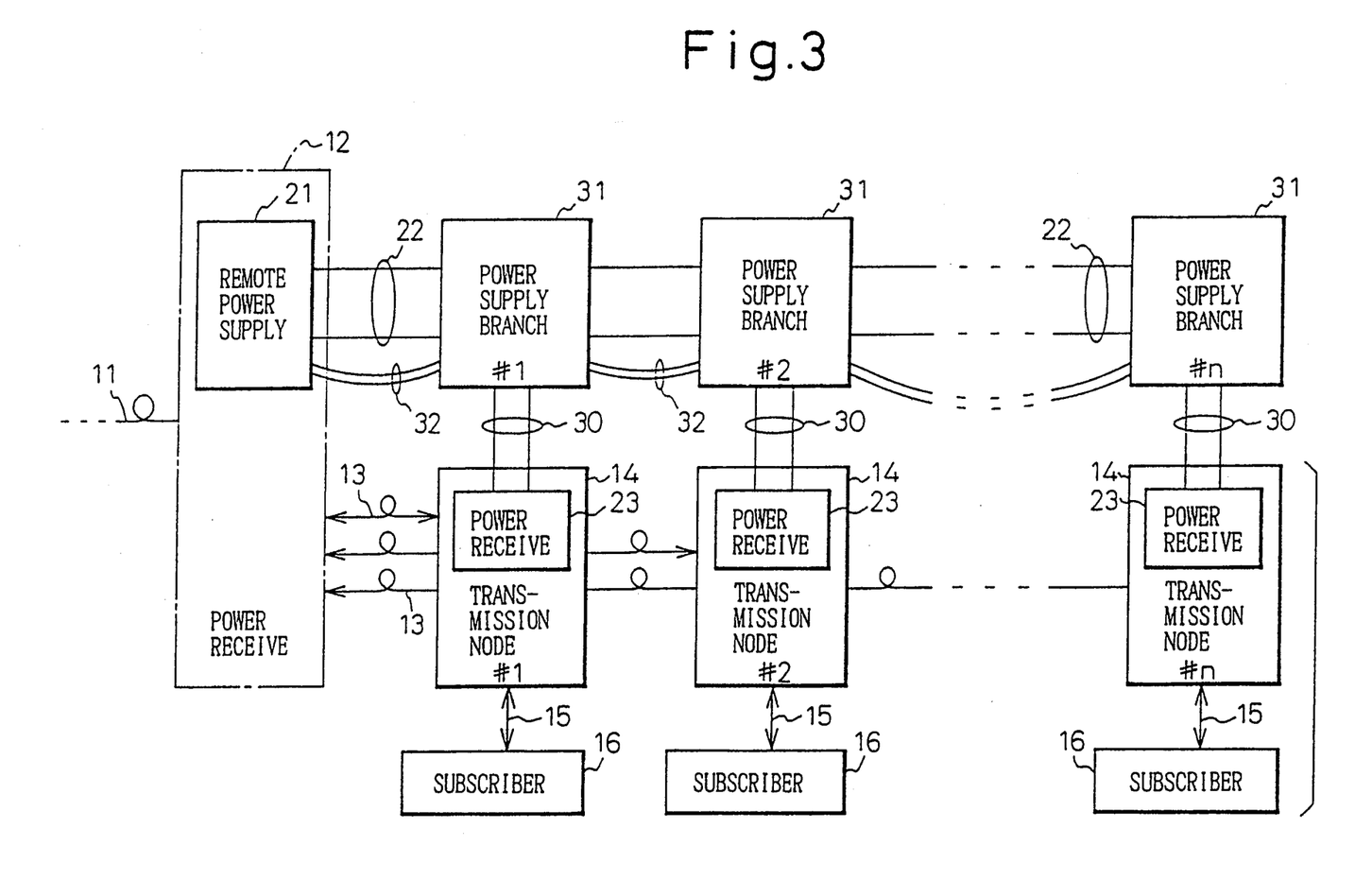
FIG. 3 illustrates a basic construction of the power supply protection system according to the present invention.

FIG. 3 illustrates a basic construction of the power supply protection system according to the present invention. Note that identical members are represented by the same reference numerals or symbols throughout the figures.

The present invention provides basically a plurality of power supply branch apparatuses 31 which are inserted in series with the pair of the power supply lines 22 and disposed in correspondence with and close to respective subscriber transmission nodes 14.

Note, here, that the reference numeral 32 denotes a communication cable which is operative to communication, when a fault occurs, between the remote power supply apparatus 21 and respective power supply branch apparatuses 31.

Figure 4:
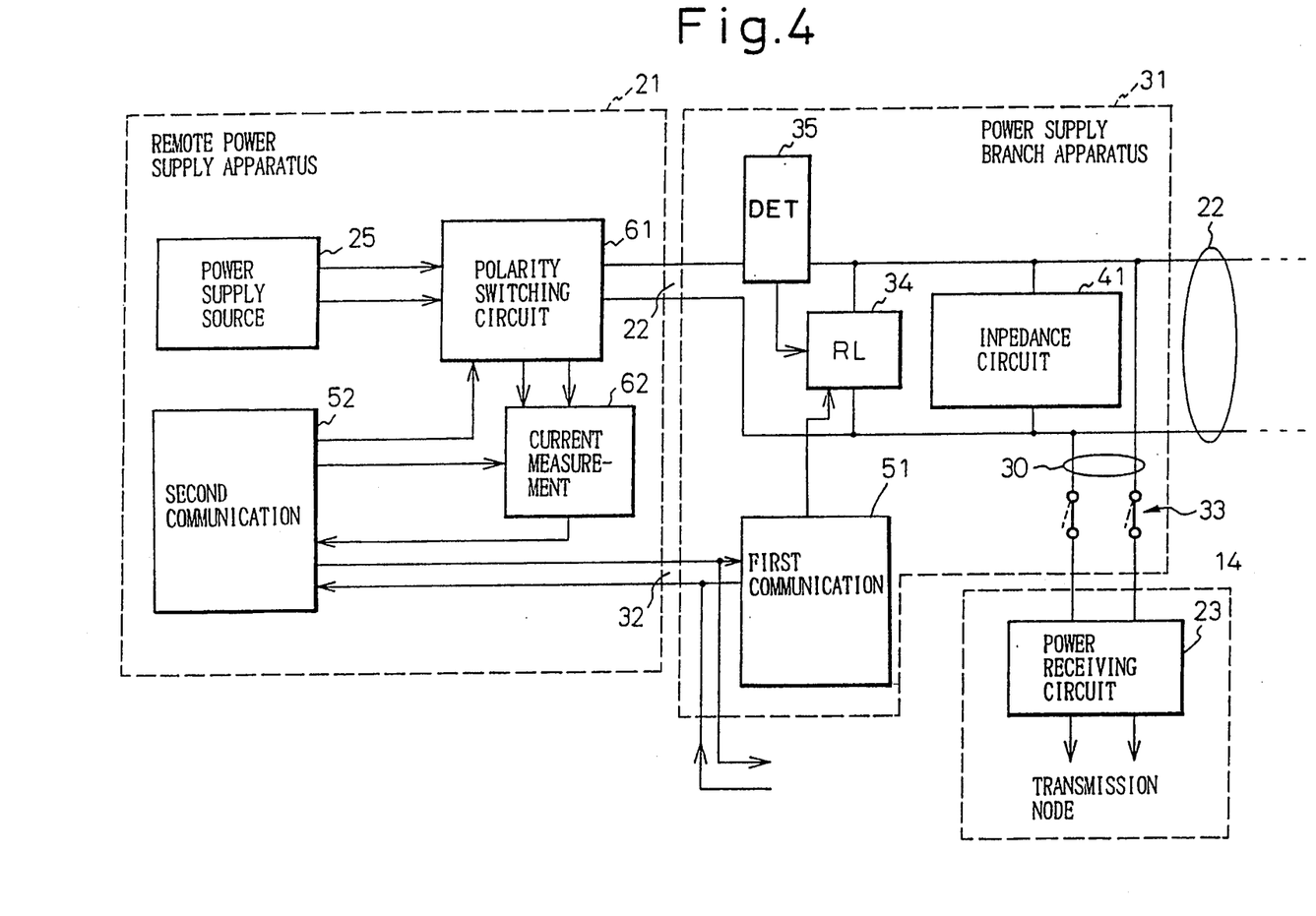
FIG. 4 is a view in which the constituents of FIG. 3 featured by the present invention are illustrated in enlarged form.

FIG. 4 is a view in which the constituents of FIG. 3 featured by the present invention are illustrated in enlarged form. In FIG. 4, each of the power supply branch apparatuses 31 is comprised of normally closed contacts 33 which are inserted in a pair of power supply branch lines 30 which is distributed from the pair of power supply lines 22 to respective power receiving circuits 23; an overcurrent detector (DET) 35 which is inserted in series with the pair of power supply lines 22; and a relay (RL) 34 which is operative, when the overcurrent detector 35 detects an occurrence of an overcurrent, to open the normally closed contacts 33.

Each of the power supply branch apparatuses 31 further includes an impedance circuit 41, which is inserted in parallel with the pair of power supply lines 22. The impedance circuit 41 is operative to flow a current therethrough when a power is supplied with polarity opposite to the polarity of the remote power supply.

Further, each of the power supply branch apparatuses 31 further includes a first communication means 51 which is operable to control the relay, (RL) 34, while the remote power supply apparatus 21 includes a second communication means 52 which cooperates with the first communication means 51. The second communication means 52 is operative, via a plurality of the first communication means 51 (only one is shown for brevity), to deenergize, in order one by one, the relays 34 which have been energized by the overcurrent detector (DET) 35 to close the normally closed contacts 33 in this order, and the remote power supply is restarted selectively only through the normally closed contacts 33 which do not activate the overcurrent detector during the sequential operation to close these normally closed contacts 33.

Further, the remote power supply apparatus 21 includes a polarity switching circuit 61 which is operative to switch the polarity of the remote power supply, and current measurement equipment 62 which is operative to measure a current flowing, when all of the relays (RL) 34 are energized through respective first communication means 51 and the polarity of the remote power supply is switched to the other polarity, through the pair of power supply lines 22 via the impedance circuits 41, thereby selected relays (RL) 34 are deenergized via corresponding ones of first communication means 51 and the second communication means 52 to close the corresponding normally closed contacts 33 mounted in the power supply branch apparatus 31 located at a distance calculated by a value of the thus measured current and also mounted in the power supply branch apparatuses 31 located between the above power supply branch apparatus 31 and the remote power supply apparatus 21.

The operation of the power supply protection system will be explained below with reference to FIGS. 3 and 4, assuming that a short-circuit fault occurs at the portion indicated by "SHORT-CIRCUIT" in FIG. 2. Because of the fault, the overcurrent detector 35 in the power supply branch apparatus 31 (#2 see FIG. 2) is first activated. At substantially the same time, the overcurrent detector 35 mounted in the upstream side power supply branch circuit 31 (#1) and also the overcurrent detector 35 (see FIG. 5) mounted in the remote power supply apparatus 21 are activated.

In responding to the above activation of the overcurrent detectors 35 in respective power supply branch apparatuses 31 (#2 and #1), corresponding relays 34 are energized. As a result of this, the normally closed contacts 33 in respective apparatuses 31 (#1 and #2) are opened. By the opening of these relay contacts 33, particularly by the opening of the relay contacts 33 of the apparatus 31 (#2), the related short-circuit fault is cut off from the pair of the power supply lines 22.

This being so, in the above exemplified case, if the relay contacts 33 of the apparatus 31 (#1) are closed again, it will be possible to feed the power to the apparatus 31 (#1) again. In this case, although it is known at the remote power supply apparatus 21 that some fault has occurred due to the activation of the overcurrent detector 35, it is not known for which apparatus the relay contacts 33 can be closed again.

For this purpose, by the use of the second communication means 52 and the first communication means 51, each of the relays 34 are deenergized in order one by one from, e.g., the upstream side of the power supply lines 22 to close each set of relay contacts 33 in this order. Note that the relay contacts of the relay deenergized so far remain as they are.

Through the process of the above sequential closing of the relay contacts, the process comes to the subscriber located close to the short-circuit fault. At this moment, the overcurrent detector 35 of this subscriber is activated again. By this reactivation of the overcurrent detector 35 the remote power supply apparatus 21 can specify the portion where the short-circuit fault in question has occurred. Then, the apparatus 21 energizes, through the second communication means 52, only the relay 34 selected via the corresponding first communication means 51 of the subscriber located close to the short-circuit fault. Thereafter, the fault can be repaired by maintenance personnel. Note here that the usual communications for the normal subscribers can be restarted promptly.

If it is found that no overcurrent detector is reactivated even in the above mentioned sequential search, the second communication means 52 of the remote power supply apparatus 21 assumes that an open-circuit fault might have occurred as indicated by "X" shown in FIG. 2. According to the above assumption, the second communication means 52 opens all the relay contacts once by energizing all the relays 34 via respective first communication means 51. Thereafter, the second communication means 52 issues a polarity switching command to the polarity switching circuit 61 to reverse the polarity of the power on the power supply lines 22 to become opposite to the polarity of the aforesaid remote power supply. Also the current measurement equipment 62 is activated simultaneously.

As a result, a current with opposite polarity flows on the power supply lines 22 by way of the impedance circuit 41, and the thus flowed current is measured by the current measurement equipment 62, whereby the power supply branch apparatus 31 located closest to the open-circuit fault in question can be specified from a location which is calculated by the value of the thus measured current. Then the second communication means 52 deenergizes the relays 34 of the apparatus 31 via respective first communication means 51, which apparatuses 31 are disposed between the thus specified apparatus 31 and the upstream side remote power supply apparatus 21, so that the corresponding relay contacts 33 are closed. Here, the service for subscribers disposed upstream from the open-circuit fault can be recovered.

The closer to the ends of the lines 22 the open-circuit fault takes place, the larger the value of the measured current becomes. This is because, more impedance circuits 41 are connected in parallel across the power supply lines 22. Based on the above fact, the second communication means 52 of the remote power supply apparatus 21 obtains each current value through current measurements while the current flows with opposite polarity, and connecting the impedance circuits 41 in parallel one by one to the power supply lines 22 from the upstream side (the side of the apparatus 21). The thus obtained current values are recorded in the second communication means 52 in correspondence with respective subscribers. The thus recorded current values are used to compare with the current value measured during the aforesaid search of the open-circuit fault. When the comparison reveals a match at a certain subscriber, the open-circuit fault can be determined to have occurred immediately down stream of this subscriber.

Figure 5:
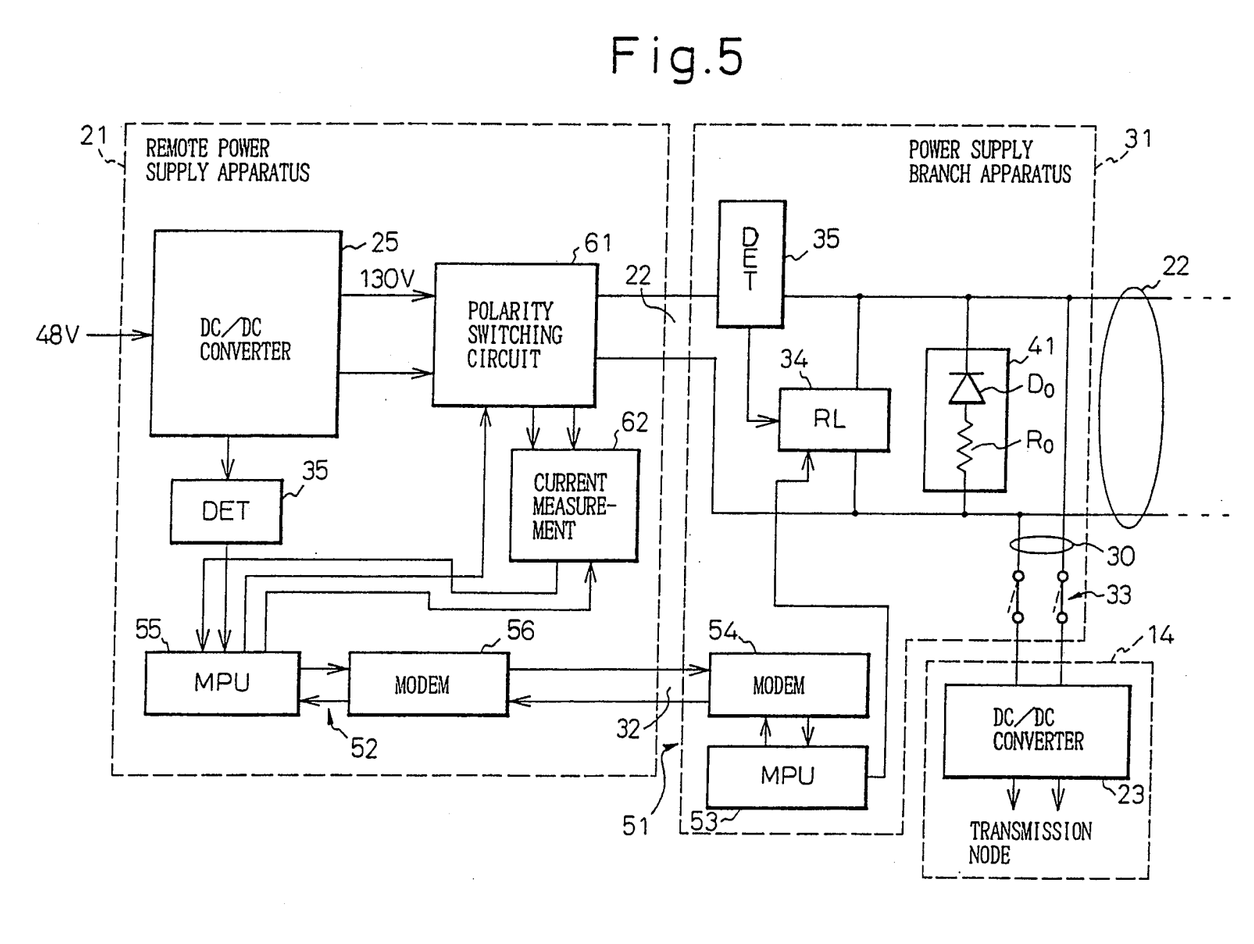
FIG. 5 illustrates an embodiment of a power supply protection system according to the present invention.

FIG. 5 illustrates an embodiment of a power supply protection system according to the present invention. In other words, the construction shown in FIG. 5 is a specific example of the block diagram shown in FIG. 4. The power supply source 25 in the remote power supply apparatus 21 consists of a DC/DC converter. To the DC/DC converter 25, a DC voltage of, e.g., 48 V is supplied by the remote office 12 (FIG. 3), and the DC voltage of $-48$ V is increased to a DC voltage of, e.g., 130 V. The level of 130 V is, in the North America and so on, a maximum admissible voltage dealt with by maintenance man.

The impedance circuit 41 consists of a diode $D_0$ and a resistor $R_0$, both of which are connected in series. The diode $D_0$ conducts only when power from the remote power supply with opposite polarity is applied. Therefore the impedance circuit 41 is turned off during usual operation of the remote power supply. The impedance can most simply be realized by a resistor, as the resistor $R_0$.

The first communication means 51 is comprised of a microprocessor unit (MPU) 53 and a MODEM (modulator-demodulator) 54. The second communication means 52 connected, via the communication cable 32, to the first communication means 51, is similarly comprised of a microprocessor unit (MPU) 55 and a MODEM 56.

The aforesaid overcurrent detector mounted in the remote power supply apparatus 21 is also illustrated in this figure, the overcurrent detector 35 being operative to detect a fault occurring at any portion along the power supply lines 22.

The power receiving circuit 23 consists of a DC/DC converter for decreasing the aforesaid DC voltage of 130 V to a DC voltage of, e.g., 24 V.

Figure 6:
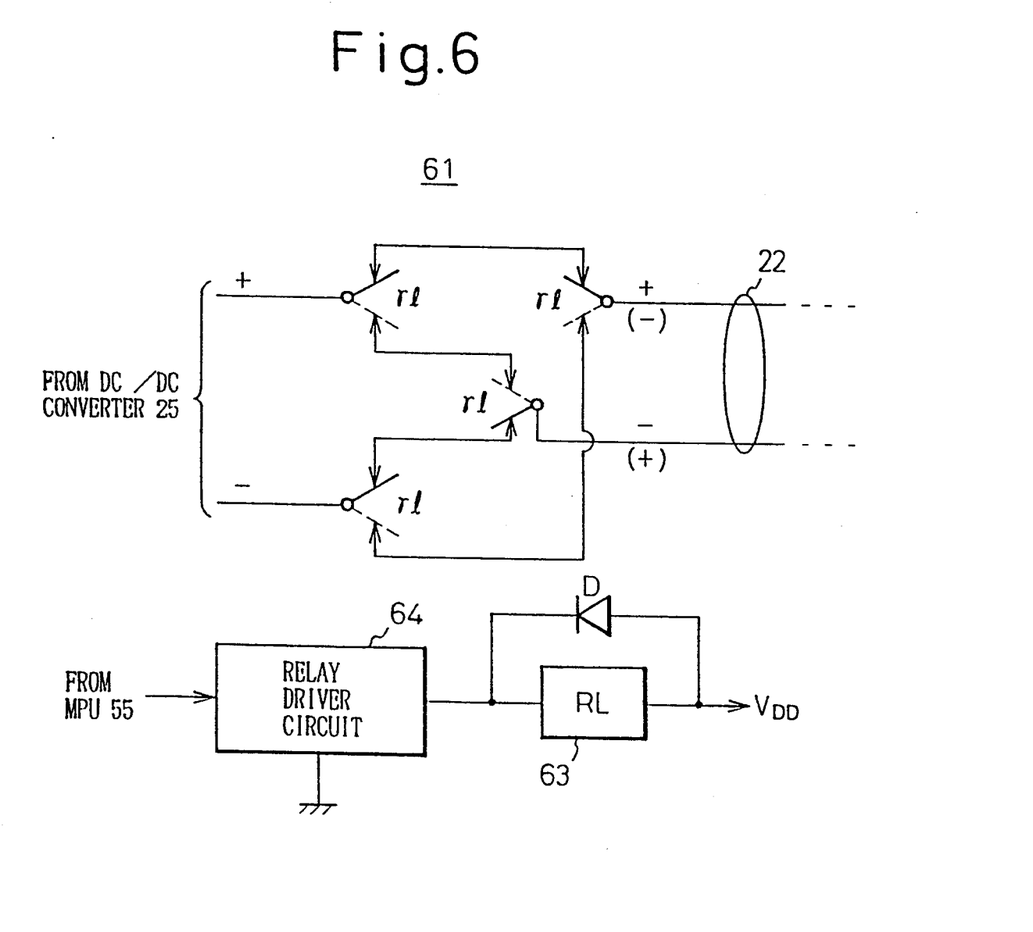
FIG. 6 illustrates a detailed example of the polarity switching circuit.

FIG. 6 illustrates a detailed example of the polarity switching circuit. The polarity switch command issued from the MPU 55, first, starts a relay driver circuit 64 to energize a relay (RL) 63. Incidentally, the reference character "D" represents a diode for absorbing a counter-electromotive force induced across the relay coils.

The relay 63 is, e.g., a 4-transfer relay which is provided with four sets of transfer relay contacts rl. The relay contacts are changed over, when the polarity switch command is given, from the connections of shown with solid lines to the other connections shown with broken lines.

Usually, the relay 63 is not energized, and therefore, power from the remote power supply is applied with such polarity as shown by +, − indicating the pair of power supply lines 22 via the solid-line indicated routes of respective relay contacts rl.

If the relay 63 is energized power from the remote power supply is applied with such polarity as shown by (+), (−) indicating the pair of the power supply lines 22 via the broken-line indicated routes of respective relay contacts rl, so that an open-circuit fault can be recovered.

As explained above, according to the present invention, a power supply protection system is realized which can suppress to the minimum the effect caused by a short-circuit fault and so on, to be applied to the power supply route for an optical subscriber network.

I claim:

1. A power supply protection system applied to an optical subscriber network which is comprised of a plurality of subscriber transmission nodes for each subscriber, the subscriber transmission nodes having respective power receiving circuits to which a remote power is supplied through a pair of power supply lines from a remote power supply apparatus in a multi-drop form, said power supply protection system including a plurality of power supply branch apparatuses inserted in series with said pair of power supply lines and disposed in correspondence with and close to said subscriber transmission nodes, wherein each of said power supply branch apparatuses comprises:

normally closed contacts inserted in a pair of power supply branch lines which branch lines are distributed from said pair of power supply lines to said power receiving circuits; an overcurrent detector inserted in series with said pair of power supply lines; a relay connected to said overcurrent detector and to said normally closed contacts and being operative when said overcurrent detector detects an occurrence of an overcurrent, to open said normally closed contacts; an impedance circuit connected in parallel with said pair of power supply lines, said impedance circuit being operative to pass a current therethrough when power is supplied with polarity opposite to the polarity of said remote power supply; and a first communication means operable to control said relay;

said remote power supply apparatus including a second communication means which cooperates with said first communication means; a polarity switching circuit connected to said second communication means and being operative to switch a polarity of said remote power supply; and a current measurement equipment connected to said polarity switching circuit and to said second communication means and being operative to measure a current flowing, when all relays are energized through said first communication means, and a polarity of said remote power supply is switch to an opposite polarity, through said pair of power supply lines via impedance circuits of said power supply branch apparatuses, whereby selected relays of said all relays are deenergized via corresponding first communication means and second communication means to close corresponding normally closed contacts of a predetermined power supply branch apparatus the location of which is determined by a value of the measured current and also of said power supply branch apparatuses located between said predetermined power supply branch apparatus and said remote power supply apparatus.

2. A power supply protection system as set forth in claim 1, wherein each impedance circuit consists of both a diode and a resistor connected in series, the diode becoming conductive when power from said remote power supply apparatus with opposite polarity is applied.

3. A power supply protection system as set forth in claim 1, wherein each of said first communication means and second communication means are comprised of both a microprocessor unit and a MODEM, and said first and second communication means are connected via communication cable.

4. A power supply protection system as set forth in claim 1, wherein an open-circuit fault can occur close to said predetermined power supply branch apparatus, the location of which is determined by said value of the measured current.

5. A power supply protection system as set forth in claim 4, wherein said location is found by comparing the thus measured current value with each of previously measured current values recorded in said remote power supply apparatus.

6. A power supply protection system as set forth in claim 1, wherein said polarity switching circuit consists of 4-transfer relay contacts inserted between a remote power supply source and ends of said pair of power supply lines.

7. A power supply protection system as set forth in claim 6, wherein said remote power supply source is comprised of a DC/DC converter for increasing a voltage level and each of said power receiving circuits is comprised of a DC/DC converter for decreasing a voltage level.

8. A power supply protection system applied to an optical subscriber network which is comprised of a plurality of subscriber transmission nodes for each subscriber, the subscriber transmission nodes having respective power receiving circuits to which a remote power is supplied through a pair of power supply lines from a remote power supply apparatus in a multi-drop form, said power supply protection system including a plurality of power supply branch apparatuses inserted in series with said pair of power supply lines and disposed in correspondence with and close to said subscriber transmission nodes, wherein each of said power supply branch apparatuses comprises:

normally closed contacts inserted in a pair of power supply branch lines which branch lines are distributed from said pair of power supply lines to said power receiving circuits; an overcurrent detector inserted in series with said pair of power supply lines; and a relay connected to said overcurrent detector and to said normally closed contacts and being operative when said overcurrent detector detects an occurrence of an overcurrent, to open said normally closed contacts; and a first communication means being operable to control said relay; said remote power supply apparatus including a second communication means which cooperates with said first communication means, wherein said second communication means is operative, via said first communication means, to individually deenergize, in a sequential order, relays of said power supply branch apparatuses which relays have been energized by said overcurrent detector to close said normally closed contacts in said sequential order, and said remote power supply is restarted selectively only through the normally closed contacts which do not activate said overcurrent detector during deenergization in said sequential order to close said normally closed contacts.

9. A power supply protection system as set forth in claim 8, wherein said second communication means is operative, via respective first communication means, to individually deenergize said relays in a sequential order in a direction from an upstream side to a down stream side of said remote power supply apparatus, and a related short-circuit fault can occur at a location where said overcurrent detector is first activated during deenergization of the relays in said sequential order.

10. A power supply protection system as set forth in claim 9, wherein each of said first communication means and second communication means are comprised of both a microprocessor unit and a MODEM, and said first and second communication means are connected via a communication cable.

* * * * *